March 23, 1954  R. MILLER  2,672,852
COMBUSTION CHAMBER FOR FOUR CYCLE DIESEL ENGINES
Filed Sept. 21, 1948
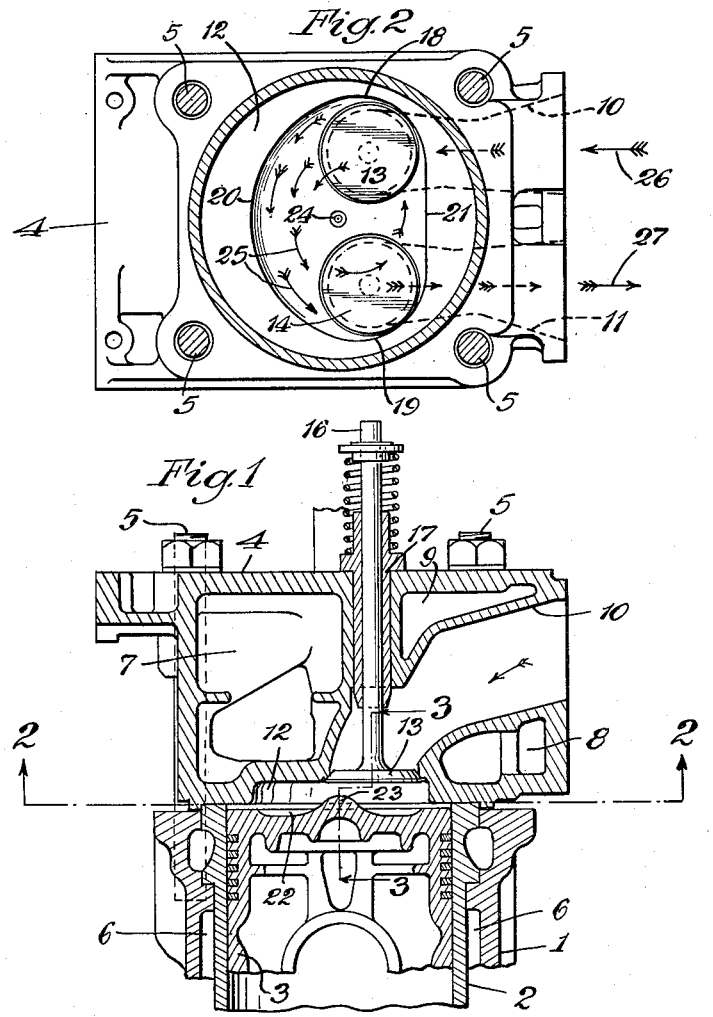
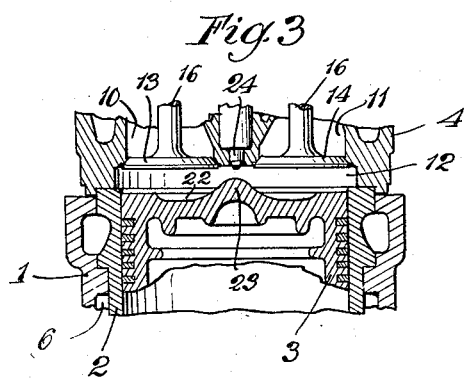
Inventor
Ralph Miller
by Parker + Carter
Attorneys.

Patented Mar. 23, 1954

2,672,852

UNITED STATES PATENT OFFICE 2,672,852

COMBUSTION CHAMBER FOR FOUR CYCLE DIESEL ENGINES

Ralph Miller, Milwaukee, Wis., assignor to Nordberg Manufacturing Company, Milwaukee, Wis., a corporation of Wisconsin Application September 21, 1948, Serial No. 50,404

2 Claims. (Cl. 123—32)

My invention relates to improvements in combustion chambers for internal combustion engines. One object of the invention is to provide a combustion chamber wherein there will be a minimum resistance to or interference with rotary turbulence.

Another object of the invention is to provide a combustion chamber wherein the piston head bounding one side of the combustion chamber offers minimum resistance to rotary turbulence.

Another object of the invention is to provide a combustion chamber in the engine cylinder head of such depth that without unduly increasing the clearance space, there may still be ample room for the lift of both the intake and exhaust valves.

Another object of the invention is to provide a combustion chamber especially suitable for a short stroke, self-ignition engine, wherein rotary turbulence will be interfered with to a minimum, wherein valve lift will not interfere with the piston, and wherein the clearance space may be reduced to a minimum.

The combustion chamber is formed between the piston top and the cylinder head in such a manner that the greater part of the total combustion chamber volume lies above a plane through the underside of the cylinder head perpendicular to the cylinder axis. The depth of the depression of the combustion chamber into the cylinder head beyond this plane is preferably equal to or greater than the lift of the exhaust and inlet valve so that no depressions or clearance pockets are required in the piston crown to provide clearance for the valve heads when they are in wide open position. The piston top is, therefore, finished by a simple turning operation and so offers minimum resistance to the rotating movement of the air in the cylinder.

It is well known that rotating air movement in the combustion chamber during the period when fuel is being injected is beneficial in bringing the fuel and air into contact, which in turn improves combustion efficiency.

The movement of the air and gas throughout the complete cycle is unidirectional. This flow condition offers minimum resistance to air and gas movement. Smooth, streamlined flow is especially beneficial during the scavenging period in a supercharged engine when, during the end of the exhaust stroke and the beginning of the suction stroke, both exhaust and inlet valves are open for the purpose of blowing the exhaust residual gases out of the clearance space. The flow is then from the air manifold past the intake port, the intake valve, across the clearance space and without reversing direction out past the exhaust valve and the exhaust port.

Other objects will appear from time to time throughout the specification and claims.

My invention is illustrated more or less diagrammatically in the accompanying drawings, wherein—

Figure 1 is a vertical section through the upper end of the cylinder and the cylinder head;

Figure 2 is a section along the lines 2—2 of Figure 1;

Figure 3 is a section along the line 3—3 of Figure 1;

Like parts are indicated by like characters throughout the specification and drawings.

I have shown only the head end of an engine cylinder, the details of the engine, valve operating mechanism, crank shaft, connecting rod, etc. are conventional and form no part of my present invention.

1 is a cylinder, 2 a cylinder liner removable in the usual manner. 3 is a piston mounted for reciprocation in the liner 2. 4 is a cylinder head held on the cylinder to close its upper end by bolts 5. 6 is a water jacket spaced between the cylinder and cylinder liner. 7, 8, 9 indicate water jacket spaces in the cylinder head. 10 is the air intake passage and 11 the gas exhaust passage in the cylinder head. These passages terminate in the combustion chamber 12. Their ingress and egress is controlled by intake valve 13, exhaust valve 14, each carried by a stem 16 mounted for reciprocation in a sleeve 17. The combustion chamber 12 is of smaller cross sectional area than the engine cylinder. The depth of the combustion chamber 12 is such that the valves 13 and 14 at maximum excursion do not extend into the cylinder below the bottom of the cylinder head. These two valves are located at one side of the combustion chamber and the axes of the exhaust and intake passages are generally parallel. The combustion chamber is rounded about the valves as indicated at 18, 19. The wall of the combustion chamber furthest removed from the intake and exhaust passages is generally curved as at 20 and generally tangent to the lines of ingress and egress of air and exhaust gases. The wall of the combustion chamber nearest the intake and exhaust passages is generally flat as at 21 or may be slightly outwardly curved.

The piston head has disposed in its upper face an annular depression 22, generally co-extensive with the combustion chamber in the cylinder head. The central portion of the piston extends upwardly as at 23 so that while the outer periphery of the piston does not project at its upper dead center out of the cylinder liner, the extension 23 does extend upwardly into the combustion chamber in the cylinder head.

The injection nozzle 24 is located generally on the longitudinal axis of the cylinder immediately above the projection 23 but never contacted thereby. The spray nozzle discharges its spray radially toward all sides of the combustion chamber, the direction of spray discharge being generally downward about eight or ten degrees below horizontal so that a flat cone of sprayed fuel is discharged into the combustion chamber.

The turbulent movement of rotation of the gas in the combustion chamber is indicated by the arrows 25, intake by the arrows 26, exhaust by the arrows 27. The radial moving fuel spray thus is projected along the line of movement of the rotating air current so that the air current impinges on the spray and produces effective mixing and atomization. There is nothing in any wall, side, top or bottom of the combustion chamber to substantially interfere with the rotary movement of the gas.

It will be realized that, whereas I have described and illustrated a practical and operative device, nevertheless, many changes may be made in the size, shape, arrangement, number and disposition of parts without departing materially from the spirit of my invention. I wish, therefore, that my showing be taken as, in a large sense, illustrative or diagrammatic, rather than as limiting me to my precise showing.

The use and operation of my invention are as follows:

The intake and exhaust valves seat in the top of the combustion chamber in the cylinder head. As they open they move down toward the piston head but they do not ever touch the head. One side of the combustion chamber is bounded by the piston head, the major part of the combustion chamber is located within the cylinder head. The relationship between the axial depth of the combustion chamber and the lift of the exhaust and intake valves is such that when the piston is at upper dead center, both valves may be in wide open position.

The injection nozzle which is located generally at the axis of the cylinder and so generally adjacent the center line of the combustion chamber discharges its fuel spray laterally, radially and downwardly into the combustion chamber. Its downward component is but very slight so that there is a minimum tendency of liquid spray to impinge on combustion chamber walls either in the cylinder head or the piston and so cause carbon deposit or other difficulties. The spray thus has a maximum line of movement through the combustion chamber and is exposed for a maximum distance to the impact of the rapidly rotating air charge.

The piston head is annularly depressed so that with this direction of spray discharge, there will be a minimum of impingement of liquid fuel on the piston head. The central portion of the piston head projects upwardly toward the spray nozzle in the interest of reducing clearance. Since the spray is fanned out in a flat cone, there would be an air pocket immediately beneath the spray nozzle and this air pocket is reduced by the upward extension of the piston.

The side wall of the combustion chamber furthest from the exhaust and intake valves is curved, so that gas entering as air through the intake valve and passing out as products of combustion through the exhaust valve tends to be guided on a curved path, thus aiding in the flow of gases through the combustion space. The side wall of the combustion chamber nearest the valves is flattened in the interest of decreasing clearance space. The walls directly adjacent the valves, and joining the curved outside wall to the side wall between the valves, can be termed "shrouding walls," as they are spaced directly adjacent to the valve ports so as to shroud them.

If the piston head itself were flat, that would result in a reduction of clearance space, but would cause direct impingement of liquid fuel from the nozzle against the piston head at upper dead center which, of course, is undesirable, as tending to cause carbon deposition on the piston head.

I claim:

1. In a four-stroke cycle internal combustion engine, a cylinder and cylinder head, a piston movably mounted in the cylinder, a combustion chamber above the piston in the cylinder head bounded by walls generally parallel to the axis of the cylinder, intake and exhaust valves and ports with seats in the cylinder head, the valves being adapted to be actuated to open when the piston is at and adjacent top dead center between the exhaust and intake strokes to provide increased scavenging, the depth of the combustion chamber in the cylinder head being substantially less than any of its diametrical dimensions but slightly greater than the maximum excursion of either the intake or exhaust valve, parallel intake and exhaust passages relatively adjacent each other and terminating at the valve ports and seats so as to communicate with the combustion chamber, the passages being disposed at a substantial angle with respect to the axis of the cylinder so that the entering air and exhausting gases will have substantial components of movement perpendicular to the axis of the cylinder, the combustion chamber having a flat wall adjacent and between the valve seats, and shrouding walls tangent to the opposed ends of the flat wall, the shrouding walls being curved around and directly adjacent the valve seats so that they shroud a portion of each of the valve ports and seats, a curved wall joining the shrouding walls with a radius of curvature substantially greater than the radius of curvature of the shrouding walls so that the air entering the combustion chamber during scavenging will tangentially contact the wall of the combustion chamber at the shrouding wall adjacent the inlet port, will smoothly traverse the curved wall, and will tangentially depart from the shrouding wall adjacent the exhaust port while remaining substantially on the opposite side of the plane of farthest excursion of the valves from the piston when the piston is at top dead center, the surface of the piston opposed to the combustion chamber being depressed in an annular configuration so as to define with the cylinder head an annular combustion zone during combustion between the compression and expansion strokes and an annular scavenging zone with the cylinder head between the exhaust and intake strokes.

2. In a four-stroke cycle internal combustion engine, a cylinder and cylinder head, a piston movably mounted in the cylinder, a combustion chamber above the piston in the cylinder head bounded by walls generally parallel to the axis of the cylinder, intake and exhaust valves and ports with seats in the cylinder head, the valves being adapted to be actuated to open when the piston is at and adjacent top dead center between the exhaust and intake strokes to provide increased scavenging, the depth of the combustion chamber in the cylinder head being substantially less than any of its diametrical dimensions but slightly greater than the maximum excursion of either the intake or exhaust valve, parallel intake and exhaust passages relatively adjacent each other and terminating at the valve ports and seats so as to communicate with the combustion chamber, the passages being disposed at a substantial angle with respect to the axis of the cylinder so that the entering air and exhausting gases will have substantial components of movement perpendicular to the axis of the cylinder, the combustion chamber having a first wall adjacent and between the valve seats and second walls tangent to the opposed ends of the first wall and curved around the valve seats, the second wall around the inlet seat being a shrouding wall and positioned directly adjacent the inlet valve seat so that it shrouds a portion of the port and seat, a third curved wall joining the second walls with a radius of curvature substantially greater than the radius of curvature of the second walls so that the air entering the combustion chamber during scavenging will tangentially contact the wall of the combustion chamber at the shrouding second wall adjacent the inlet port, will smoothly traverse the curved third wall, and will tangentially depart from the second wall adjacent the exhaust port while remaining substantially on the opposite side of the plane of farthest excursion of the valves from the piston when the piston is at top dead center, the surface of the piston opposed to the combustion chamber being depressed in an annular configuration so as to define with the cylinder head an annular combustion zone during combustion between the compression and expansion strokes and an annular scavenging zone with the cylinder head between the exhaust and intake strokes.

RALPH MILLER.

References Cited in the file of this patent

UNITED STATES PATENTS

| Number | Name | Date |
|---|---|---|
| 1,741,355 | Barkeij | Dec. 31, 1929 |
| 1,792,867 | Radford | Feb. 17, 1931 |
| 1,910,558 | Milbrath | May 23, 1933 |
| 2,001,358 | Guernsey | May 14, 1935 |
| 2,055,814 | Dennison | Sept. 29, 1936 |
| 2,205,493 | Saurer | June 25, 1940 |
| 2,214,688 | Wiebicke | Sept. 10, 1940 |
| 2,349,305 | Pyk | May 23, 1944 |
| 2,394,576 | Winfield | Feb. 12, 1946 |

FOREIGN PATENTS

| Number | Country | Date |
|---|---|---|
| 862,633 | France | Dec. 9, 1940 |